April 8, 1969 D. E. MURRAY ETAL 3,437,840
GATED STORAGE ELEMENTS FOR A SEMICONDUCTOR MEMORY
Filed Sept. 9, 1965 Sheet 1 of 2

INVENTORS
Donald E. Murray
Walter C. Seelbach
BY
Mueller, Aichele & Rauner
ATT'YS.

GATED STORAGE ELEMENTS FOR A SEMICONDUCTOR MEMORY

Filed Sept. 9, 1965

INVENTORS
Donald E. Murray
Walter C. Seelbach
BY
Mueller, Aichele & Rauner
ATT'YS.

United States Patent Office 3,437,840
Patented Apr. 8, 1969

3,437,840
GATED STORAGE ELEMENTS FOR A SEMI-CONDUCTOR MEMORY

Donald E. Murray and Walter C. Seelbach, Scottsdale, Ariz., assignors to Motorola, Inc., Franklin Park, Ill., a corporation of Illinois Filed Sept. 9, 1965, Ser. No. 486,043
Int. Cl. H03k *17/56*
U.S. Cl. 307—247 8 Claims This invention relates to logic gate circuits and in particular to an input gating circuit for a bistable multivibrator memory storage element.

Logic circuit elements, employing semiconductor devices, have been developed in which the logic functions are performed by switching currents between alternative paths. In one form of a logic circuit element, used as a memory, a bistable multivibrator circuit is used to maintain the flow of a unit of current, representing the information to be stored, through one of two paths. The flow of the unit of current through one path represents a "0" and the flow of current through the other path represents a "1."

In a circuit of this type it is necessary that circuitry be provided so that the flow of the unit of current in the multivibrator can be changed as desired thus changing the information stored in the logic memory element. Prior art logic elements have required separate input gates in order to change the information stored in the memory element. Each of the input gates requires a separate unit of current for operation resulting in a very large increase in the power consumption of the memory element. Where large numbers of memory circuits of this type are combined in a data processing device it is important that the power consumption of each of the logic elements of the data processing device be a minimum. The semiconductor devices comprising the logic element should be operated in an unsaturated condition so that the logic element will be capable of high speed operation. The power requirements for the clocking signals controlling the operation of the logic element should also be low.

It is, therefore, an object of this invention to provide a logic memory element having an improved input and control circuit which requires only one unit of current for operation and in which the semiconductor devices operate in an unsaturated condition.

A feature of this invention is the provision of a logic memory element having a bistable multivibrator circuit which stores data information by establishing a flow of current through one of two current paths.

Another feature of this invention is the provision of a logic memory element having input switching means coupled to the current paths for controlling the flow of current through the current paths. Control switching means coupled to the bistable multivibrator circuit and the input switching means determine whether the bistable cir-circuit or the input switching means controls the flow of current through the current paths.

The invention is illustrated in the drawings in which.

In practicing this invention a bistable multivibrator memory element is provided having first and second current paths. The bistable element maintains the flow of current through a particular selected path when no inputs are present. The flow of current through one path may represent a "0" and the flow of current through the other path may represent a "1." Input circuit means in the form of switching elements, are coupled to each of the current paths and can also control the flow of current through the current paths. Control switching means are coupled to the input switching means and the bistable multivibrator circuit. The condition of the control switching means determines whether the flow of current through the paths is controlled by the bistable multivibrator or the input switching means. When the control switching means is in a condition which permits the multivibrator element to control the flow of current the multivibrator acts to maintain the flow of current through the path last selected by the input switching means. In all the switching operations only one unit of current flows in the logic element and its input circuitry. Two or more memory elements can be coupled together to provide toggle or shift register stages.

Figure 1:
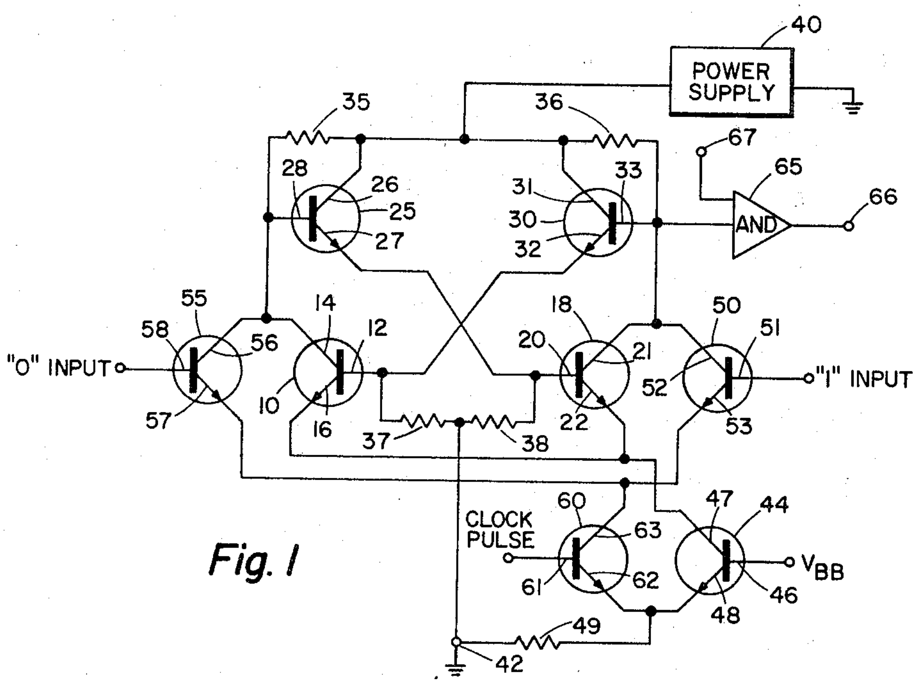
FIG. 1 is a schematic showing the circuit of a logic memory element of this invention.

FIG. 1 is a schematic of a logic memory element incorporating the features of this invention. Transistors 10, 18, 25 and 30 are coupled together to form a bistable multivibrator circuit. Transistors 10 and 18 are commonly referred to in the art as "holding" transistors since one or the other of these transistors holds the flip-flop in a fixed conductive state in the absence of binary input signals applied to the flip-flop. The emitter followers 25 and 30 are commonly referred to as feedback or DC level shifting transistors and these transistors establish proper DC levels at the bases of holding transistors 10 and 18. Base 12 of transistor 10 is coupled to collector 21 of transistor 18 through emitter 32 and base 33 of transistor 30. Base 20 of transistor 18 is coupled to collector 14 of transistor 10 through emitter 27 and base 28 of transistor 25. Load resistors 35 and 36 couple collectors 14 and 21 respectively to power supply 40. Power supply 40 is coupled to a first reference potential. Emitters 16 and 22 of transistors 10 and 18 are coupled together and to the first reference potential through collector 47 and emitter 48 of transistor 44 and resistor 49. Resistors 37 and 38 couple emitters 27 and 32 of transistors 25 and 30 respectively to the first reference potential.

In operation transistor 25 acts as an emitter follower feedback circuit coupling the potential on collector 14 of transistor 10 to base 20 of transistor 18 and transistor 30, also acting as an emitter follower, couples the potential on collector 21 of transistor 18 to base 12 of transistor 10. Resistors 37 and 38 act as load resistors for the emitter followers. This feedback circuit biases transistors 10 and 18 so that one of them will be conducting while the other will be non-conducting. For the purpose of this example assume that transistor 10 is conducting. With transistor 10 conducting current will flow from power supply 40 through resistor 35, collector 14, emitter 16 of transistor 10 through collector 47, emitter 48 of transistor 44, and resistor 49 to the first reference potential. Transistor 44 is assumed to be biased to permit this conduction and the operation of this transistor will be described in a subsequent portion of this specification. The flow of current through resistor 35 reduces the potential on collector 14. This reduced potential is coupled to base 20 of transistor 18 biasing this transistor to non-conduction. Since no current is flowing through transistor 18 the potential on collector 21 is high and this potential is coupled to base 12 of transistor 10 to bias this transistor on. Thus, because of the feedback incorporated in this circuit, bias potentials are developed through the conduction of one transistor which maintain this transistor in conduction and maintains the other transistor in a condition of non-conduction. One unit of current flows through one of the current paths formed by resistors 35 and 36 to store data in the memory element. Resistor 49 limits the current flowing through the transistors so that they will operate in an unsaturated condition.

Transistors 60 and 44 have their emitters 62 and 48 respectively coupled to the first reference potential through resistor 49. Transistor 44 may be referred to as a reference switching gate transistor and transistor 60 may be referred to as a clocking switching gate transistor. Base 46 of transistor 44 is coupled to a second reference potential $V_{BB}$. Base 61 of transistor 60 is coupled to a clocking or synchronizing potential which is normally maintained at a potential less than the second reference potential $V_{BB}$. Thus in normal operation transistor 44 is biased to conduction by $V_{BB}$ and current is permitted to flow through the bistable memory element formed by transistors 10, 18, 25 and 30. In this mode of operation information is stored in the memory element. Information can be read out of the memory element through an AND gate circuit 65. When a read pulse is applied to read terminal 67 the potential appearing on collector 21 of transistor 18 is coupled to output terminal 66 for utilization by other circuit elements.

To change the information stored in the memory element, without utilizing more than one unit of current, an input switching circuit, including first and second preset transistors 50 and 55 are used. Collector 56 of transistor 55 is coupled to collector 14 of transistor 10 and emitter 57 of transistor 55 is coupled to collector 63 of transistor 60. Collector 52 of transistor 50 is coupled to collector 21 of transistor 18 and emitter 53 of transistor 50 is coupled to collector 63 of transistor 60. Base 58 of transistor 55 is adapted to receive an input signal, in this instance representing a binary "0," while base 51 of transistor 50 is adapted to receive a signal representing binary "1." The binary "1" and binary "0" signals applied to the memory element are in the form of voltages which will bias the transistor to which they are applied to conduction. At the same time that the bias voltage is applied to base 51 or base 58 of transistors 50 and 55, a clock or synchronizing pulse is applied to base 61 of transistor 60, biasing transistor 60 to conduction and biasing transistor 44 to non-conduction.

Assume, for example, that transistor 18 is biased to conduction and transistor 10 is biased to non-conduction, thus storing a "1" in the memory element, and it is desired to change the "1" to a "0." To accomplish this a clock pulse is applied to base 61 of transistor 60 while at the same time a pulse is applied to base 58 of transistor 55 biasing transistors 55 and 60 to conduction. When transistor 60 is biased to conduction transistor 44 is biased to non-conduction, thus no current can flow through either of the transistors 10 or 18. However, current will flow through transistor 55 and through resistor 35. The drop in potential through resistor 35 is coupled to base 20 of transistor 18, biasing this transistor to non-conduction. When transistors 18 and 50 are nonconducting and when holding transistor 10 is conducting, logic resistor 36 conducts a small amount of base current into the base of emitter follower transistor 30. Emitter follower transistor 30 supplies base current to holding transistor 10 when the latter transistor is conducting. At the same time, logic resistor 35 is conducting collector current into the collector 14 of the holding transistor 10. Conversely, if holding transistor 18 is conducting and the holding transistor 10 is nonconducting, then logic resistor 35 conducts base current to emitter follower transistor 25 and logic resistor 36 conducts collector current to the collector 21 of the holding transistor 18. Therefore, the logic resistors 35 and 36 and the emitter follower transistors 25 and 30 conduct slightly at all times.

When the clocking pulse is removed transistor 44 is biased to conduction and transistor 60 is biased to non-conduction. The bias voltage established by input switching transistors 50 and 55 cause the bistable multivibrator memory element to maintain the flow of current through resistor 35 and a "0" is stored in the memory element. Throughout the operation of the input circuit only one unit of current flows in the memory element, thus there is no increase in the power consumed by the memory element.

Figure 2:
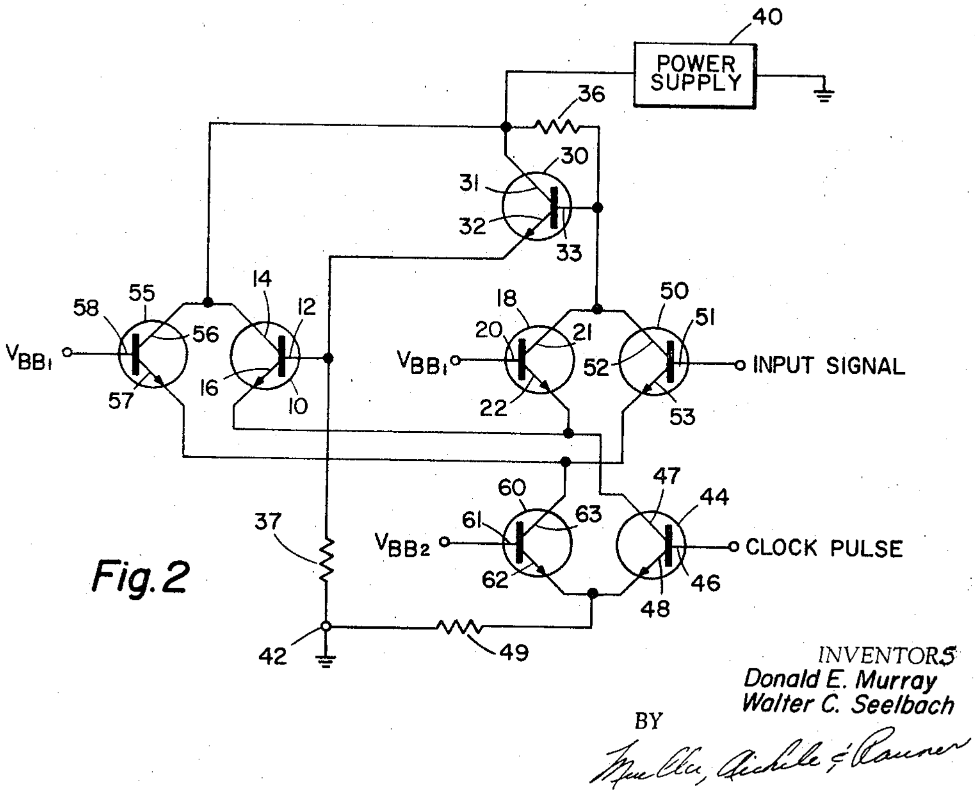
FIG. 2 is a schematic of a modified form of the circuit of FIG. 1.

FIG. 2 shows an embodiment of the invention, particularly adaptable for use in an integrated circuit and in a logic system wherein a positive logic level indicates a binary "1" and a negative logic level indicates a binary "0." In FIG. 2 those portions of the circuit which are the same as FIG. 1 have the same reference numerals.

In the circuit of FIG. 2, collector 14 of holding transistor 10 is coupled directly to power supply 40 and base 20 of holding transistor 18 is coupled to a second reference potential $V_{BB1}$. The second reference potential, $V_{BB1}$, applied to base 20 of transistor 18 is approximately mid-way between the high and low levels of the logic signals. Assume, for example, that transistor 18 is conducting. The current flowing through resistor 36 produces a voltage drop which lowers the voltage applied to collector 21 of transistor 18. This voltage is applied through transistor 30 to base 12 of transistor 10 as previously described. The value of resistor 36 is chosen so that the voltage drop across resistor 36 is sufficient to bias transistor 10 to non-conduction. When transistor 10 conducts no current flows through resistor 36 and thus the potential applied to collector 21 is high. This high potential minus the drop through transistor 30 is also applied to base 12 of transistor 10 biasing transistor 10 to conduction and transistor 18 to non-conduction.

Base 58 of preset transistor 55 is also coupled to the second reference potential $V_{BB1}$ and the input signal is applied only to base 51 of preset transistor 50. A high input signal applied to base 51 of transistor 50 attempts to bias transistor 50 to conduction and transistor 55 to non-conduction. A low input signal applied to base 51 of transistor 50 attempts to bias transistor 55 to conduction and transistor 50 to non-conduction. A third reference potential $V_{BB2}$ is applied to base 61 of reference switching gate transistor 60. The clock pulses are applied to base 46 of clocked switching gate transistor 44.

The operation of the circuit of FIG. 2 is similar to that of FIG. 1. A negative clock pulse applied to base 46 of transistor 44 biases transistor 44 to non-conduction and transistor 60 to conduction. With transistor 60 conducting an input logic signal applied to base 51 of transistor 50 determines whether transistor 50 or 55 will conduct. If the potential of the input logic signal is high transistor 50 is biased to conduction and current flows through resistor 36. In this condition a bias potential is developed which attempts to bias transistor 10 to non-conduction and transistor 18 to conduction. If the potential applied to base 51 of transistor 50 is low, transistor 50 is biased to non-conduction. There is no current flow through resistor 36 and a bias potential is developed which attempts to bias transistor 10 to conduction and transistor 18 to non-conduction. When the clock pulse is removed from base 46 of transistor 44, transistor 44 will again be biased to conduction and current will flow through transistor 10 or transistor 18 as determined by the input logic signal applied during the time transistor 44 was non-conducting and transistor 60 was conducting.

Figure 3:
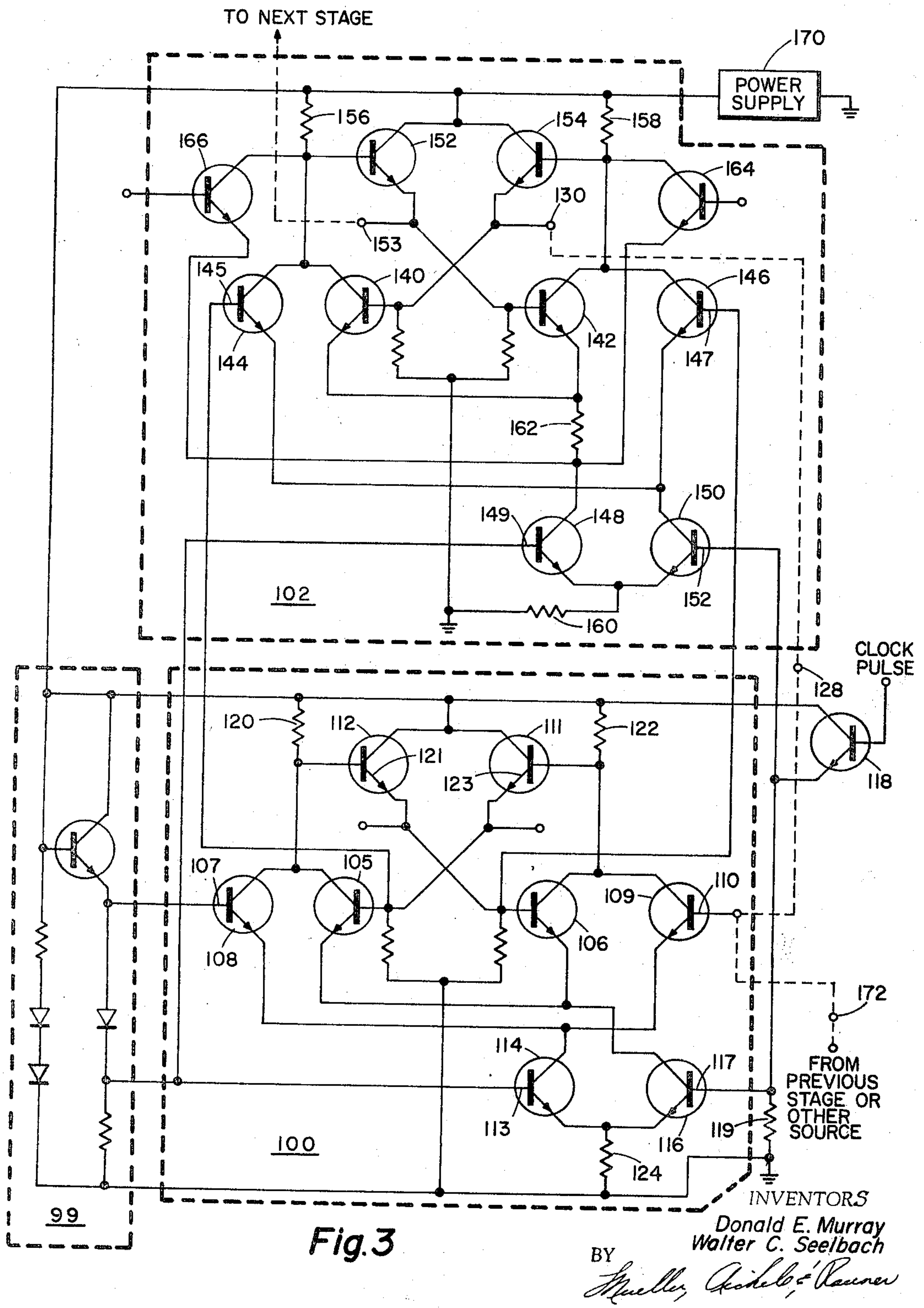
FIG. 3 is a schematic showing a combination of two of the logic memory elements of this invention used as a shift register stage or for toggle operation.

FIG. 3 illustrates the operation of two of the logic elements having the features of this invention which can be connected together to form a circuit having a toggle output or as a stage of a shift register. Logic element 100 is similar to the circuit of FIG. 1 and operates in the same manner as the circuit of FIG. 1. Input switching or preset transistors 108 and 109 of FIG. 3 operate in the same manner as input switching or preset transistors 50 and 55 of FIG. 1 except that base 107 of transistor 108 is coupled to a reference voltage circuit 99 which provides a second reference bias voltage $V_{BB}$ for the system. Base 113 of transistor 114 is also coupled to the reference bias voltage circuit 99 through diodes to provide the proper voltage bias level for transistor 114. Reference bias circuit 99 provides a stable, temperature compensated reference bias voltage for the operation of the system of this invention.

Logic element 102 of FIG. 3 is also similar to that of the circuit of FIG. 1 and operates in a manner similar to that of logic element 100. In FIG. 3 base 149 of control switching transistor 148 is coupled to base 113 of control switching transistor 114 and base 152 of control switching transistor 150 is coupled to base 117 of control switching transistor 116. Thus, control switching transistors 148 and 114 conduct at the same time and control switching transistors 116 and 150 conduct at the same time. However, control switching transistor 148 operates to control the flow of current through the bistable multivibrator current switching transistors 140 and 142 while control switching transistor 114 operates to control the flow of current through the input switching transistors 108 and 109. Transistor 150 operates to control the flow of current through the input switching or preset transistors 144 and 146 while control switching transistor 116 operates to control the flow of current through the bistable multivibrator current switching transistors 105 and 106.

Transistor 118 and resistor 119 form an emitter follower circuit to provide a high impedance input for the clock pulses which are coupled to base 117 of transistor 116 and base 152 of transistor 150. The clock pulses act in the manner previously described in the description of the operation in FIGS. 1 and 2 to bias transistors 116 and 150 to non-conduction and bias transistors 114 and 148 to conduction. A power supply 170 provides a current for the operation of the logic elements. Transistors 166 and 164 of logic element 102 provide means for presetting memory element 102. These inputs may be used for parallel transfer when the circuit of FIG. 3 is used as a stage of a shift register.

In operation, with no clock signal present, transistors 116 and 150 are biased to conduction. With these transistors biased to conduction the bistable multivibrator memory element of logic element 100 is coupled to the first reference potential through resistor 124 thus permitting current to flow through one of the two current paths of the bistable multivibrator memory element as previously described in the description of the operation of the circuits of FIGS. 1 and 2. With transistor 150 biased to conduction input switching transistors 144 and 146 of logic element 102 are coupled to the first reference potential through resistor 160 permitting the data stored in logic element 102 to be changed by applying the desired signal to input transistors 144 and 146. Base 145 of transistor 144 is coupled to emitter 123 of transistor 111 and base 147 of transistor 146 is coupled to emitter 121 of transistor 112 so that the input signal applied to logic element 102 will be the same as that stored in the bistable multivibrator memory element of logic element 100. When a clock signal is applied to bases 117 and 152 of transistors 116 and 150 transistors 114 and 148 are biased to conduction. With transistor 148 biased to conduction the input signal applied to logic element 102 (the information previously stored in logic element 100) is stored in the bistable multivibrator memory element of logic element 102. With transistor 114 biased to conduction the logic element 100 is in condition to receive an input signal which is normally applied to base 110 of preset transistor 109.

The operation of FIG. 3 as a toggle circuit will now be described. A toggle circuit is a circuit in which the output alternates between two states as a clock or synchronizing signal is applied to the circuit. In the circuit of FIG. 3 complementary outputs may be taken from emitters 121 and 123 of transistors 111 and 112. The output signal will vary between a "1" and a "0" each time a clock signal is received. To perform this operation, a connection 128 is coupled between output terminal 130 of logic element 102 and base 110 of preset transistor 109. This connection is shown dotted in FIG. 3 as it is not used when the circuit of FIG. 3 is used as a stage of shift register.

Assume, for example, that the flow of current through resistors 122 and 158 represent a "1" and a flow of current through resistors 156 and 120 represents a "0." Assume, also, that in the initial condition no clock pulses are present and transistor 106 is biased to conduction so that current flows through resistor 122, transistors 106 and 116 and resistor 124 to the first reference potential. Thus, the potential on emitter 123 of transistor 111 is low and the potential on emitter 121 of transistor 112 is high. The high potential on emitter 121 is coupled to base 147 of input switching transistor 146 and the low potential on emitter 123 is coupled to base 145 of input switching transistor 144. Transistor 146 is biased to conduction and transistor 144 is biased to non-conduction and current flows through resistor 158, transistors 146 and 150 and resistor 160 to the first reference potential. The currents flowing in logic elements 100 and 102 each represent a "1."

When a clock pulse is applied to the clock input of transistor 118, transistors 116 and 150 are biased to non-conduction and transistors 114 and 148 are biased to conduction. With transistor 148 biased to conduction the "1" received by input transistor 146 is stored in the bistable multivibrator memory of logic element 102 and current continues to flow through resistor 158. With transistor 116 biased to non-conduction and transistor 114 biased to conduction, logic element 100 is in condition to receive a new input signal. This input signal is received from output terminal 130 of logic element 102. Since current flows through resistor 158, the potential at terminal 130 is low and this low potential applied to base 110 of preset transistor 109 biases transistor 109 to non-conduction and preset transistor 108 to conduction. Biasing transistor 108 to conduction couples a "0" to logic element 100. With transistor 108 biased to conduction current flows through resistor 120, transistors 108 and 114 and resistor 124 to reference potential. When the clock pulse is removed, transistors 116 and 150 are biased to conduction and the "0" input to logic element 100 is stored in the bistable multivibrator memory element of this logic circuit and current continues to flow through resistor 120.

The flow of current through resistor 120 produces a low potential on emitter 121 on transistor 112 while the potential on emitter 123 of transistor 111 is high. These potentials coupled to bases 145 and 147 of transistors 144 and 146 bias transistor 144 to conduction and transistor 146 to non-conduction. Current will then flow through resistor 156, transistors 144, 150 and resistor 160 to the reference potential causing a "0" input to be applied to logic circuit 102. The next clock pulse applied to transistor 118 will cause the output signal of logic element 100 to shift to the "1" state in the same manner. This operation is continuous as long as clock pulses are applied to transistor 118.

The operation of FIG. 3 as a stage of a shift register will now be described. When connected as a shift register conductor 128 from output terminal 130 to base 110 of transistor 105 is removed. An input conductor 172 applies an input signal to base 110 of transistor 109. The input signal may be from a prior stage of the shift register or if the stage of FIG. 3 is the first stage the input signal applied to base 110 of transistor 109 will be the input signal to the shift register. An output signal from the shift register stage of FIG. 3 will be coupled from output terminal 153 to a subsequent stage of the shift register or to other utilization circuits if the stage of the shift register represented by FIG. 3 is the last stage of the shift register.

Assume that the prior stage contains a "0" while the stage shown in FIG. 3 contains a "1." Thus as previously described, current will flow through resistors 122 and 158. When a clock pulse is applied to transistor 118, transistors 114 and 148 are biased to conduction and transistors 116 and 150 are biased to non-conduction. Under these conditions the flow of current through resistor 158 will bias transistors 140 and 142 so that this flow of current through resistor 158 is maintained and a "1" is stored in the bistable multivibrator memory element of logic element 102. Biasing transistor 114 to conduction and 116 to non-conduction permits the input switching transistors 108 and 109 to control the flow of current in resistors 120 and 122 of logic element 100. This flow of current is controlled by the input signal received from the prior stage over input conductor 172. Since it was assumed that a "0" was stored in the previous stage of the shift register, transistor 108 is biased to conduction and current will flow through resistor 120. The subsequent stage connected to output terminal 153 of logic element 102 operates in a similar manner to that of logic circuit 100. Since no current flows through resistor 156 the potential on output terminal 153 of logic element 102 represents a "1" and this signal is coupled to the subsequent stage to bias the input switching transistor of that stage so that a "1" will be received by the stage.

When the clock pulse applied to transistor 118 is removed, transistor 116 is biased to conduction and transistor 105 is also biased to conduction because of the flow of current through resistor 120. Thus a "0" is stored in logic circuit 100. As previously described, the "0" is coupled to logic circuit 102 biasing input switching transistor 144 to conduction so that current flows through resistor 156. Thus the data signal stored in the stage of FIG. 3 has been transferred to the subsequent stage while the stage of FIG. 3 is now storing the signal received from the prior stage. Each time a clock pulse is received the process is repeated.

Thus a circuit has been described which provides for control of a bistable multivibrator memory element operating in a current switching mode. The memory element may be operated in an unsaturated condition permitting high speed operation and no more than one unit of current flows in each logic circuit. The circuit is readily adapted to integrated circuit construction and the circuits can be combined to produce logic devices capable of toggle operation or for use as a stage of a shift register.

We claim:

1. An input gating circuit for a bistable memory circuit, the memory circuit including first and second current switching means coupled in a bistable circuit configuration and operative to alternately conduct as the memory circuit is switched from one to the other of its two bistable states, the input gating circuit adapted to be connected to the output terminals of a prior memory stage and differentially driven thereby, said input gating circuit including, in combination: a first preset gate coupled in parallel with said first current switching means and a second preset gate coupled in parallel with said second current switching means, the first and second preset gates connected to a first common node and the first and second current switching means connected to a second common node, a current switching reference gate differentially connected to a current switching clocking gate, means for connecting said current switching gates to a source of differential signals which differentially control the conductivity of said current switching gates, one of said current switching reference and clocking gates connected to said second common node and the other of said current switching reference and clocking gates connected to said first common node, said one current switching gate operatively biased into conduction to maintain the memory circuit in its previous conductive state when signals applied thereto override the potential applied to said other switching gate, and said other switching gate operatively biased into conduction when a signal applied thereto overrides the potential on said one switching gate, said other switching gate enabling the memory circuit to be switched from one to the other of its two stable states by input signals applied to said first and second preset gates, input terminal means for connecting said first and second preset gates, respectively, to the output terminals of the prior memory stage, said input terminal means connected to each of said first and second preset gates for receiving binary input signals that override the potentials on said first and second current switching means and change the conductive state of said memory circuit.

2. An input gating circuit for a bistable memory circuit, the memory circuit including first and second current switching means coupled in a bistable circuit configuration and operative to alternately conduct as the memory circuit is switched from one to the other of its two stable states, and feedback circuit means including third and fourth current switching means coupled respectively to the first and second current switching means and shifting the DC levels in the bistable memory circuit to establish the alternate conduction of the first and second current switching means as the memory circuit is switched from one to the other of its two stable states, the input gating circuit adapted to be connected to the output terminals of a prior memory stage and differentially driven thereby, said input gating circuit including, in combination: a first preset gate coupled in parallel with said first current switching means and a second preset gate coupled in parallel with said second current switching means, said first and second preset gates connected to a first common node and said first and second current switching means connected to a second common node, a current switching reference gate differentially connected to a current switching clocking gate, means for connecting said current switching reference and clocking gates to a source of differential signals which differentially control the conductivity of said current switching reference and clocking gates, one of said current switching reference and clocking gates connected to said second common node and the other of said current switching reference and clocking gates connected to said first common node, said one switching gate operatively biased into conduction to maintain the memory circuit in its previous conductive state when signals applied thereto override the potential on said other switching gate, and said other switching gate operatively biased into conduction when a signal applied thereto overrides the potential on said one switching gate, said other switching gate enabling the memory circuit to be switched from one to the other of its two stable states by input signals applied to said first and second preset gates, input terminal means for connecting said first and second preset gates, respectively, to the output terminals of the prior memory stage, said input terminal means connected to each of said first and second preset gates for receiving binary input signals capable of overriding the potentials on said first and second current switching means to thereby change the conductive state of said memory circuit.

3. The gating circuit according to claim 2 wherein said first and second preset gates are transistors having the collector-emitter paths thereof connected in parallel with said first and second current switching means, respectively, and having the bases thereof connected to said input terminal means.

4. An input gating circuit for a bistable memory circuit, the memory circuit including first and second holding transistors coupled in a bistable circuit configuration to alternately conduct current as the memory circuit is switched from one to the other of its two conductive states, and a feedback circuit connected to at least one of the first and second holding transistors and providing a current path to and bistable switching action for said one of said first and second holding transistors, the input circuit adapted to be connected to the output terminals of a prior memory stage and differentially driven thereby, said input gating circuit including, in combination: first and second preset gate transistors coupled respectively in parallel with said first and second holding transistors, said preset gate transistors operative to receive binary input signals and to conduct current and to override said first and second holding transistors, thereby changing the conductive state of the memory circuit, said first and second preset gate transistors connected to a first common node and said first and second holding transistors connected to a second common node, first and second switching gate transistors differentially coupled between said memory circuit and a point of reference potential, means for connecting said first and second switching gate transistors to a source of differential signals which differentially control the conductivity of said switching gate transistors, one of said first and second switching gate transistors connected to said second common node and the other of said first and second switching gate transistors connected to said first common node, said one switching gate transistor operative to conduct current from said second common node and maintain the conductive state of the memory circuit fixed when a signal applied thereto overrides the potential on said other switching gate transistor, and said other switching gate transistor operative to conduct current from said first common node when a signal applied thereto overrides the potential on said one switching gate transistor, said other switching gate transistor enabling said first and second preset gate transistors to conduct current and change the conductive state of the flip-flop, input terminal means for connecting said first and second preset gate transistors, respectively, to the output terminals of the prior memory stage, said input circuit means connected to said first and second preset gate transistors for receiving binary input signals of a magnitude sufficient to change the conductive state of said memory circuit.

5. An input gating circuit for a bistable multivibrator memory circuit having first and second holding transistors coupled respectively to first and second level shifting transistors and connected between a power supply terminal and a point of reference potential, said first and second holding transistors alternately conducting as the bistable multivibrator memory circuit is switched from one to the other of two conductive states, the input gating circuit adapted to be connected to the output terminals of a prior memory stage and differentially driven thereby, said input gating circuit including, in combination: first and second preset gate transistors coupled respectively in parallel with said first and second holding transistors, said preset gate transistors operative to receive binary input signals, to conduct current and override said first and second holding transistors thereby changing the conductive state of the memory circuit, said first and second preset gate transistors connected to a first common node and said first and second holding transistors connected to a second common node, first and second switching gate transistors differentially coupled between said memory circuit and said point of reference potential, means for connecting said first and second switching gate transistors to a source of differential signals which differentially control the conductivity of said switching gate transistors, one of said first and second switching gate transistors connected to said second common node and the other of said first and second switching gate transistors connected to said first common node, said one switching gate transistor operative to conduct current from said second common node and maintain the conductive state of the memory circuit fixed when a signal applied thereto overrides the potential on said other switching gate transistor, and said other switching gate transistor operative to conduct current from said first common node when a signal applied thereto overrides the potential on said one switching gate transistor, said other switching gate transistor enabling said first and second preset gate transistors to conduct current and change the conductive state of the flip-flop, input terminal means for connecting said first and second preset gate transistors, respectively, to the output terminals of the prior memory stage, said input circuit means connected to said first and second preset gate transistors for receiving binary input signals of a magnitude sufficient to override the potentials on said first or second holding transistors and change the conductive state of said memory circuit.

6. An input gating circuit for a bistable memory circuit, said memory circuit having first and second holding transistors connected for bistable switching operation, one of the holding transistors connected to a reference biasing potential and the other of the holding transistors coupled through a feedback circuit to a voltage supply terminal, the input gating circuit adapted to be connected to the output terminals of a prior memory stage and differentially driven thereby, said input gating circuit including in combination: first and second preset gate transistors having their emitter-collector paths connected in parallel with said first and second holding transistors, said first and second preset gate transistors connected to a first node and said first and second holding transistors connected to a second node, a first current switching gate transistor differentially coupled to a second current switching gate transistor, means for connecting said first and second current switching gate transistors to a source of differential signals which differentially control the conductivity of said switching gate transistors, said first current switching gate transistor connected to said second node and said second current switching gate transistor connected to said first node, one of said first and second current switching gate transistors overriding the other current switching gate transistor when a signal applied to said one transistor overrides the potential on the other current switching gate transistor to hold the memory circuit fixed in its previous conductive state, and the other current switching gate transistor overriding said one current switching gate transistor and enabling the conductive state of the memory circuit to be switched from one to the other of its two conductive states when a potential applied thereto overrides the potential on said one current switching gate transistor, said feedback circuit operative to bias one of the holding transistors nonconductive when the potential thereon falls below a given logic level and operative to bias said one holding transistor conductive and override the reference potential on the other holding transistor when the logic potential thereon rises to a predetermined logical level, input terminal means for connecting said first and second preset gate transistors, respectively, to the output terminals of the prior memory stage, said input terminal means connected to said first and second preset gate transistors for receiving binary input signals capable of overriding the potentials on said first and second holding transistors for changing the binary conductive state of the memory circuit.

7. The circuitry defined in claim 6 wherein said feedback circuit includes a transistor connected between a voltage supply terminal and said one holding transistor for establishing a biasing potential on said one holding transistor.

8. An input gating circuit for a logic stage formed by first and second bistable multivibrator memory circuits, said first bistable multivibrator memory circuit having first and second holding transistors coupled in a bistable circuit configuration and said second bistable multivibrator memory circuit having third and fourth holding transistors coupled in a bistable circuit configuration, said first and second holding transistors connected to a first node and said third and fourth holding transistors connected to a second node, said input gating circuit including, in combination: first and second preset gate transistors connected in parallel respectively with said first and second holding transistors and further connected to a third node, third and fourth preset gate transistors connected in parallel respectively with said third and fourth holding transistors and further connected to a fourth node, a first switching gate transistor in said first multivibrator memory circuit connected to said first node and a second current switching gate transistor in said first bistable memory circuit differentially coupled to said first switching gate transistor and further connected to said second node, a third switching gate transistor connected to said third node and a fourth switching gate transistor differentially coupled to said third switching gate transistor and further connected to said fourth node, said first and fourth switching gate transistors connected to a point of reference biasing potential which enables the conductive state of the second bistable multivibrator memory circuit to be changed while maintaining the conductive state of the first bistable multivibrator memory circuit fixed, and said second and third switching gate transistors connected to a source of clock pulses whereby said clock pulses applied to said second and third switching gate transistors override the potentials on said first and fourth switching gate transistors, thereby fixing the conductive state of the second bistable multivibrator memory circuit and permitting information stored in said second bistable multivibrator memory circuit to be shifted into said first bistable multivibrator memory circuit.

References Cited

UNITED STATES PATENTS

| | | | |
|---|---|---|---|
| 3,067,336 | 12/1962 | Eachus | 307—247 |
| 3,114,053 | 12/1963 | Robinson | 307—247 |
| 3,223,853 | 12/1965 | Charbonnier | 307—247 |
| 3,321,639 | 5/1967 | Fowler | 307—235 |

ARTHUR GAUSS, *Primary Examiner.*

H. DIXON, *Assistant Examiner.*

U. S. Cl. X.R.

307—291, 261